(12) United States Patent
Ferren et al.

(10) Patent No.: US 7,092,002 B2
(45) Date of Patent: Aug. 15, 2006

(54) SYSTEMS AND METHOD FOR ENHANCING TELECONFERENCING COLLABORATION

(75) Inventors: Bran Ferren, Beverly Hills, CA (US); W. Daniel Hillis, Encino, CA (US)

(73) Assignee: Applied Minds, Inc., Glendale, CA (US)

(*) Notice: Subject to any disclaimer, the term of this patent is extended or adjusted under 35 U.S.C. 154(b) by 0 days.

(21) Appl. No.: 10/911,079

(22) Filed: Aug. 3, 2004

(65) Prior Publication Data
US 2005/0062844 A1   Mar. 24, 2005

Related U.S. Application Data

(60) Provisional application No. 60/504,085, filed on Sep. 19, 2003.

(51) Int. Cl.
*H04N 7/14*   (2006.01)
(52) U.S. Cl. .............................. 348/14.08; 348/14.09; 348/14.12
(58) Field of Classification Search .. 348/14.01–14.09, 348/14.1, 14.11, 14.12, 14.13; 370/260, 370/261; 709/204
See application file for complete search history.

(56) References Cited

U.S. PATENT DOCUMENTS 5,548,346 A * 8/1996 Mimura et al. ............. 348/738
6,128,649 A * 10/2000 Smith et al. ................ 709/217
2002/0154209 A1* 10/2002 Kenoyer et al. ......... 348/14.07

FOREIGN PATENT DOCUMENTS

| EP | 0574138 A1 | | 12/1993 |
|---|---|---|---|
| FR | 2832016 A1 | | 11/2001 |
| JP | 401206765 A | | 8/1989 |
| JP | 405145916 A | | 6/1993 |
| JP | 409154115 A | | 6/1997 |
| JP | 410023383 A | * | 1/1998 |
| JP | 02002237991 A | | 8/2002 |

* cited by examiner

*Primary Examiner*—Melur Ramakrishnaiah
(74) *Attorney, Agent, or Firm*—Michael A. Glenn; Glenn Patent Group

(57) ABSTRACT

An advanced video teleconferencing (AVTC) system uniquely combines a number of features to promote a realistic "same room" experience for meeting participants. These features include an autodirector to select audio and video sources and to compose shots, a collaboration interface for each participant to communicate nonverbal information, directional LEDs to privately alert participants, audio reflected from the main display, and a collaborative table to share a view of objects or papers on a table. When implemented with sufficient bandwidth for take advantage of these features and to keep latency time low, this AVTC system results in a highly realistic and productive teleconferencing experience.

36 Claims, 3 Drawing Sheets

SYSTEMS AND METHOD FOR ENHANCING TELECONFERENCING COLLABORATION

CROSS REFERENCE TO RELATED APPLICATIONS

This application claims priority and incorporates by reference the provisional patent application entitled "Method and Apparatus for Teleconferencing Collaboration," U.S. patent application Ser. No. 60/504,085, filed Sep. 19, 2003.

This application is related to the following U.S. patent application: "Method and Apparatus for Selection of Signals in a Teleconference", U.S. patent application Ser. No. 10/327,368, filed Dec. 20, 2002, and allowed Jun. 12, 2004.

BACKGROUND

1. Technical Field

The invention relates to teleconferencing. More particularly, the invention relates to methods for better facilitating collaboration in teleconferences.

2. Description of the Prior Art

Current video conferencing systems are deficient in their ability to support effective collaboration among conference participants, engendering a feeling of remoteness amongst the participants that is contrary to the intended benefits of the system. This deficiency can be attributed to a number of shortcomings that collectively diminish the effectiveness of the communication.

Specifically, current systems do not:
  Provide sufficiently low round trip latencies;
  Provide accurate audio cueing, i.e. remote participant voices often emanate from a location other than where the image of the remote participant is displayed;
  Allow participants to discuss and naturally interact with physical objects present at only one location;
  React to cues provided within speech patterns and content;
  Adapt the behavior of the system in response to frequently encountered meeting dynamics;
  Meaningfully track or consider personal information about the participants; or
  Offer a natural sense of eye contact between participants.

In conferences involving larger numbers of participants, several other deficiencies become apparent. Most notably, current systems do not:
  Allow participants to receive personalized information without disturbing other conference participants;
  Provide a natural means for participants to track who is present within the conference; or
  Provide a sense of the objects and people present and events transpiring in the facility surrounding the participants.

DESCRIPTION

Summary of the Invention

The invention is an advanced video teleconferencing system that allows an engaging and realistic video conferencing experience. The invention provides key visual, audio, security, storage, and administrative services needed for a video conferencing experience that cannot be attained with today's conventional methods. These include: an autodirector that automatically selects videocamera shots based on audio activity and other criteria, which are adjustable with user-settable operating modes; an interface to allow each participant to communicate nonverbally and privately with any other participants; directionally accurate audio reflected from the main display; a collaborative table to allow interaction with 2-D and 3-D objects; and directional LEDs to privately alert participants. This functionality is provided through interfaces that are simple, intuitive, and easily operated by those with little or no computer literacy.

DETAILED DESCRIPTION OF THE PREFERRED EMBODIMENT

The herein disclosed advanced video teleconferencing (AVTC) system provides a same room experience for meeting participants at physically separated locations, thereby greatly enhancing user interaction and collaboration. This is met through the combination of a number of features, each of which is described in detail below:

Low latency to enhance the immediacy of the videoconference experience.
  An autodirector to automatically select audio and video sources and to compose shots, based on a number of criteria. These criteria include audio activity, operating modes, participant identification, and other factors.
  Participant transponders or login to incorporate personal information into the autodirector criteria, including relative importance of the participant and security clearance.
  A collaboration interface for participants to communicate nonverbal information to any other participants.
  Directional LED notification to privately alert participants.
  Audio reflected from the main display, such that audio appears to originate from the speakers on the screen.
  Image-based participant identification for easy reference by participants.
  A collaborative table to share a view of objects or papers on a table, along with hand gestures.

For the purposes of this description, a "site" is a single physical location at which a VTC system is situated and a "station" is a location at a site designed to accommodate a single participant with video and audio pickups and other tools. Each site has a minimum of one station.

Figure 1:
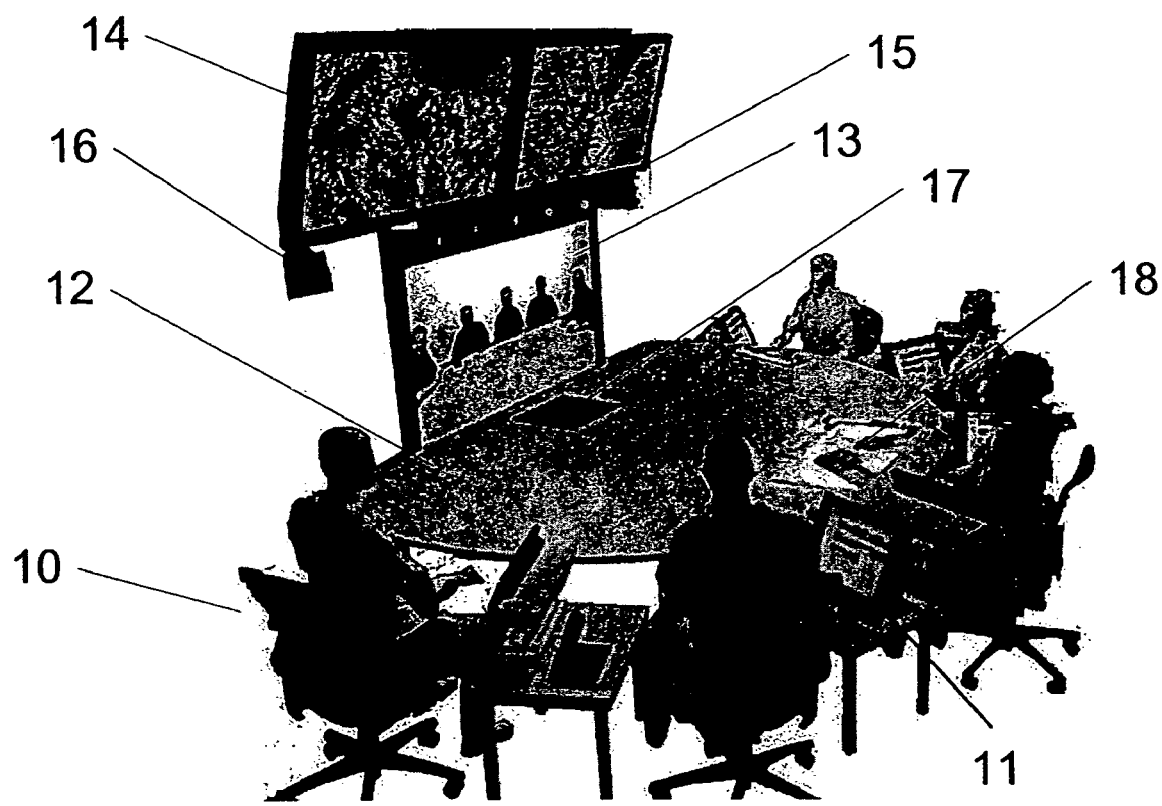
FIG. 1 depicts an overview of a VTC installation with five stations, according to the invention.

FIG. 1 depicts an overview of a VTC site with five stations, according to the invention. Each station 10 accommodates one participant, and has a collaboration interface 11. In the preferred embodiment, the interface is a touchscreen via which the participant can send and receive notes, annotate files and images, and perform other tasks. The stations are arranged around a semicircular table 12, which helps facilitates the illusion that participants from other sites are seated around the same table. Other sites and participants are shown on the main display 13. Supplemental displays 14 can show additional information, such as maps, stills, or moving images.

Narrow field videocameras 15 are aimed at each participant. A directional LED is mounted atop each videocamera to privately alert the corresponding participants. Wide field videocameras 16 capture the room context and can be panned or tilted. Audio is received through microphones for each participant, as well as room microphones to pick up conversation from observers not seated at stations and other ambient sounds. A speaker 17 below the surface of the table is aimed at the main display, thus reflecting audio back to the participants to give the illusion that the audio originates from the display itself.

The collaborative table display 18 is projected on the table 12 from an overhead projector (not shown), or alternatively from a projector beneath the table. The collaborative table is used to show maps and other flat images projected to or from another site, and shows any objects held over the area, as well as the hands of the participant pointing out features or manipulating objects.

Adequate Bandwidth for Reduced Latency

Traditionally, there is a perceived tradeoff in video conferencing systems between available bandwidth and video quality. Given an available bandwidth, the image resolution and frame rate are selected such that an aggressive, efficient compression scheme can transmit the video signal within that bandwidth. However, experience has shown that low bandwidth systems with aggressive and efficient compression and decompression (CODEC) schemes still yield poor video conferencing experiences.

The AVTC system is predicated in part on the belief that latency is the primary cause for this shortcoming. Accordingly, the AVTC system considers a tradeoff between available bandwidth and latency. In the preferred embodiment, adequate bandwidth is provided to yield round trip latencies well underneath 100 ms, preferably as low as 30 ms. Because a large fraction of the round trip latency is attributable to the operation of the CODECs, this essentially requires bandwidth great enough that the desired image size and frame rate can be transmitted at the compression ratio achievable by the CODECs in the desired latency.

If such bandwidth is not available, the latency may be preserved by reducing the frame rate or image resolution. Preferably, this tradeoff is adjusted dynamically by the AVTC system. Alternatively it may be adjusted manually, preferably by a meeting administrator seated at an administrator's console. The ability to adjust this tradeoff may be particularly useful in network configurations, where the bandwidth used by the AVTC system is a shared resource.

Autodirector

The AVTC system incorporates an autodirector that emulates the behavior of a highly experienced human video director. The autodirector automatically selects, from among one or more videocamera feeds and other video inputs, a video signal for transmission to remote video conferencing sites. In this manner, the flow of conversation among the participants of a local video conferencing site is seamlessly reconstructed at the remote teleconferencing site for viewing by the remote participants.

The autodirector selection algorithm has been described in detail in a related United States patent, "Method and Apparatus for Selection of Signals in a Teleconference", patent Ser. No. 10/327,368, filed Dec. 20, 2002 and allowed Jun. 12, 2004. The description below is focused on two other unique features of the autodirector, the operating modes and speech recognition.

Operating Modes

Because the social dynamics of any conference can change as the meeting progresses, the autodirector incorporates a sense of meeting dynamics in determining its selection of video inputs. Specific modes can be selected to match particular situations, which will adjust video and audio selection criteria used by the autodirector.

In the case where a participant wishes to address and be viewed by all participants of a meeting, the autodirector is configured to force all meeting participants to view the participant making the address. This mode is termed speech mode.

A related mode is termed lecture mode, and handles situations where a participant wishes to address another single participant to make an important point. The system is thereby configured for a one-on-one exchange between participants. The two participants in the exchange see each other, and participants at other sites see both individuals alternately, according to the dynamics of the verbal exchange.

Another mode offered by the autodirector is view force mode, where an administrator at one site can force the selection of a particular shot from a specified site. The autodirector continues to normally switch between sites, but whenever the specified site is selected, all other sites view only the particular shot from that site.

Finally, in introductory fast switching mode, a rapid switching algorithm is provided that allows the system to track the rapid exchanges that typically occur in the initial phase of a conference, in which individuals introduce themselves and meet one another.

The autodirector can be placed in any of these modes by a participant located at any site, via an administrator console. Priority is given to the latest received mode request. The current mode is displayed on the administrator console at each site. An administrator can create new modes or modify existing modes.

If the administrator does not specify a mode, the autodirector preferably selects the appropriate mode based on assumed or detected meeting dynamics. For example, in a typical business meeting, conversation often begins with a series of introductions among participants, often as a sequence of rapidly changing speakers. To capture these events effectively, the audio and video signal selected should also be changed rapidly. The autodirector may therefore automatically enter introductory fast switching mode as a meeting begins. Thus, the autodirector, aware of introductions as part of typical meeting dynamics, initially allows signal switching patterns that might appear abrupt or hurried under other circumstances.

Later in a typical meeting, meeting dialogue becomes more focused and directed. The duration for which an individual speaks typically increases as more complex issues are addressed, and extended presentations may be made. The autodirector may therefore readily enter speech mode and lecture mode during the middle of a typical meeting. An appropriate time to enter into these modes may be detected by analyzing speech patterns.

The AVTC system also stores specialized sequences of modes for use with a particular style of meeting. For example, one sequence of modes may be selected for use during a short staff meeting, while a different sequence of modes may be used for an extended board of directors meeting. These sequences are fully customizable and are stored within the system for later access. The system can therefore be made aware of dynamics specific to a particular group of participants.

The resulting system is an automated video conferencing direction system that functions in accord with, rather than in spite of, typical meeting dynamics.

Speech Recognition

To provide an enhanced understanding of which video signal is appropriate for selection at a particular time, the autodirector analyzes the conference audio. In one embodiment, the autodirector favors a shot of a participant when his or her name is detected on the audio; this is effective at capturing reaction shots. Limiting speech recognition processing to searching the audio for participant names greatly reduces the complexity of this problem.

More generally, specific words or phrases may be recognized and treated as attractors or pointers. Attractors increase the likelihood of selecting a video signal containing an image of the participant who uttered the attractor word or phrase, such as "I think," "In my opinion," or "I have here". Pointers, of which participants names are one example, encourage the selection of a particular participant other than the participant who uttered the phrase.

Audio Reflected from Monitor for Improved Audio Directionality

When audio does not seem to be coming directly from the same direction as the main display, such as from side speakers, fatigue can be generated among the participants. Conversely, proper audio directionality results in more natural, effortless communication between participants.

To provide accurate audio directionality, the AVTC system incorporates audio speakers directed at the main display showing images of the remote participants. Audio emanating from the speakers is reflected from the display and towards the listening participants, thus appearing to emanate directly from the participant shown on the main display. This effect is further enhanced by selecting a highly directional audio speaker and shielding the speaker in a manner that blocks the straight line transmission pathways between the speaker and the listening participants.

Figure 2:
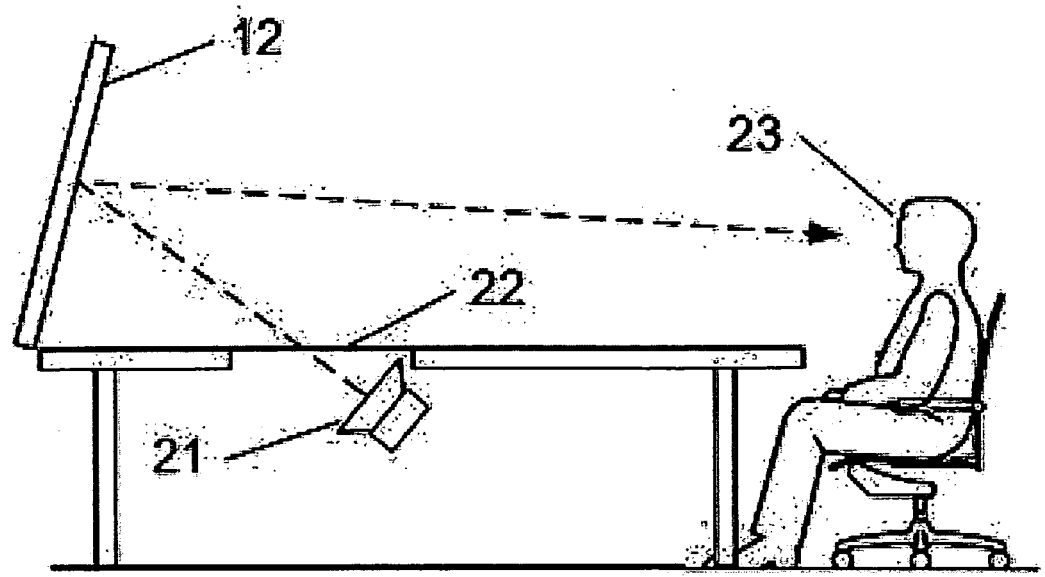
FIG. 2 depicts the reflection of audio from the main display towards the participants, according to the invention.

FIG. 2 depicts the reflection of audio from the main display towards the participants according to the invention. The speaker 21 is mounted beneath the surface of the table under an acoustically transparent material 22 and aimed at the main display 12. Audio is thereby reflected from the main display towards the participants 23, giving the illusion that the audio is originating from the center of the display.

Participant Transponders

To obtain and meaningfully incorporate participant personal information into the conference environment, one embodiment of the AVTC system uses participant transponders. Each transponder provides information about a video conferencing participant, such as his location within the conference site, organizational position and title, clearance level, and speaking characteristics. The information is provided to the autodirector, which can then make more intelligent decisions based on the personal information.

The participant transponder is worn or carried by the video conferencing participant, for example in the form of a radio frequency identification (RFID) tag embedded in a personnel ID card. More generally, the device may be incorporated within a badge, pen, laser pointer, wireless microphone, or other device common to a video conference setting. In the preferred configuration of the AVTC system, the transponder is integrated within a station at the conferencing site through the use of existing RFID card technology, either passive or active. In this scenario, the participant carries an RFID card, and the card reader is incorporated within the station, which is in turn connected to the AVTC system.

Regardless of the form factor or communication mechanism, the transponder need not broadcast all information about the participant, but instead can broadcast a participant identity that allows the AVTC system to access a complete participant profile within a database. From this database the autodirector can determine a participant hierarchy, as well as a security level for the conference as a whole. The conference security level is displayed for all participants by the autodirector. The autodirector can accept changes to the hierarchy, allowing participants to take on varying priority levels as a meeting evolves.

The database may also contain biometric data for the participants. This allows the identity of the participant to be verified by biometric measurements, such as facial features (e.g. as captured by one or more of the video cameras), or fingerprint or retinal scans.

The transponder may also allow the location of the wearer within the conference room to be determined. This can be performed locally by the transponder, and then broadcast to the AVTC system when queried. Alternatively, the location can be determined through time of flight or directional triangulation calculations based on measurements acquired from sensors placed throughout the conferencing site and operated by the AVTC system. The transponders may also be used to detect the entry or exit of a participant by analyzing the positions of the transponder signals it receives. In particular, the security level of the meeting is adjusted to reflect the participants currently present. Based on the current security level, the AVTC system allows or prohibit access to specific information or services.

Collaboration Interface

Each station is fitted with a collaboration interface for sending nonverbal information to other participants. The interface consists of a pen-enabled touchscreen display, preferably to one side of the station so as not to block the view of the participant. The interface provides access to a suite of collaboration tools:

Login—If participant transponders are not used, the participants can use this screen to login or can run an identification badge through a card reader at the side of the interface. The system can then display the person's name and title to other participants. Personalized services and preferences can be set for specific participants, such as directing their important email to their interface. When the participant logs out from the conference, the autodirector can cease selecting the view of that station. Alternatively, a presence indicator can detect if a person is sitting at the station.

Note sending—Each participant can use a virtual whiteboard to send notes or hand-drawn illustrations to any or all participants, who are alerted by a directional LED mounted above each station's videocamera. The contents of the whiteboard can be printed on a local printer, or cleared by a "Clear" button.

Figure 4:
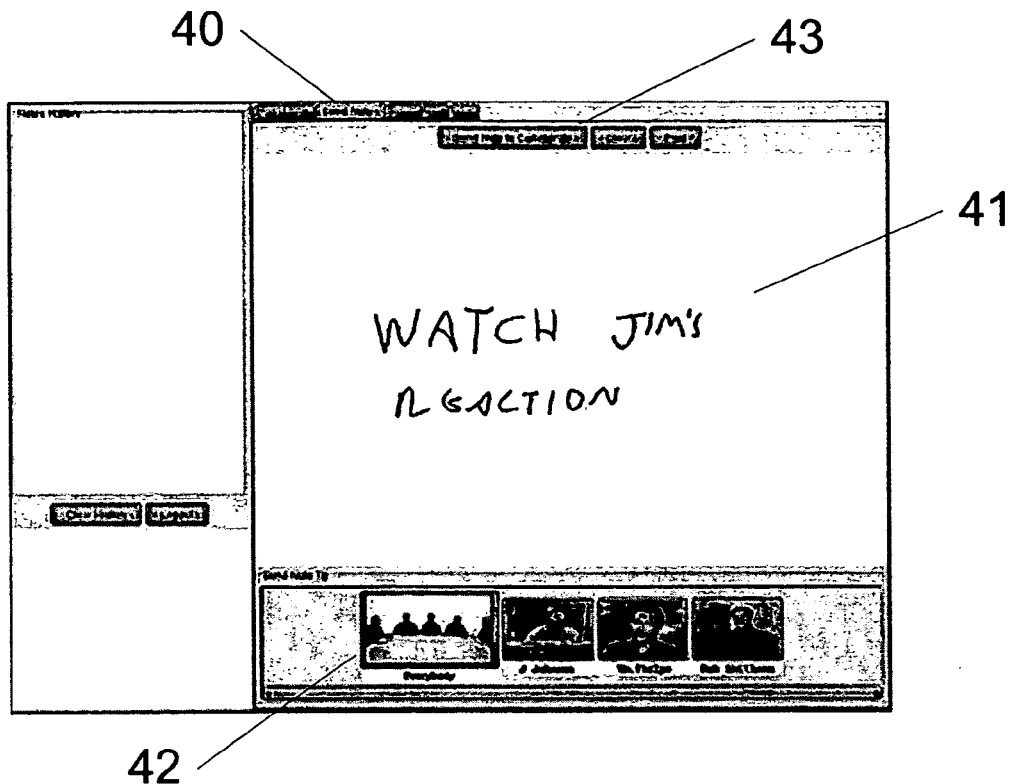
FIG. 4 depicts the note passing software which is part of the collaboration interface, according to the invention.

FIG. 4 depicts the note passing software which is part of the collaboration interface, according to the invention. The note passing mode is selected from tabs 40 at the top of the interface. Notes or sketches can be handwritten on the notes area 41 using an electronic pen tool or similar device (not shown). To send a note, the participant selects another participant from the image-based identification area 42, which contains thumbnail images of each participant. The note can then be sent or printed through control buttons 43.

Note recipients are privately alerted by the flashing of a directional LED aimed at their station.

Figure 5:
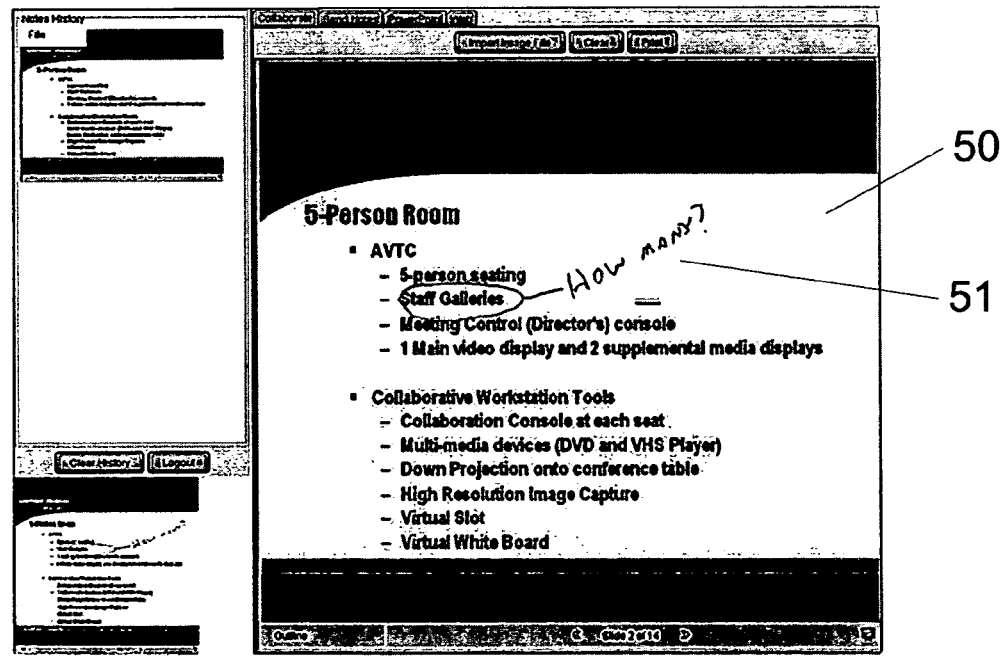
FIG. 5 depicts the shared application feature which is part of the collaboration interface, according to the invention.

> Web browser—Any participant can view, annotate, or send Web pages to other participants.
>
> Shared applications—Participants can operate software applications, such as Microsoft PowerPoint presentations, on their interface with the same annotation and distribution capabilities described above. FIG. 5 depicts the shared application feature which is part of the collaboration interface, according to the invention. In this depiction, the shared application is slide presentation software. Participants can send any image or slide 50 to the collaboration screen. All participants see the contents of the collaboration screen, which is akin to an electronic whiteboard. Participants can handwrite annotations 51, which appear in different color inks to distinguish participant's annotations.

Image-Based Participant Identification

To provide identification of the participants within a conference, the AVTC uses an image-based approach.

A still image of a participant is captured using one of the several video cameras present. Preferably, the image is captured by the camera positioned to capture a close up shot of the participant. The image is then reduced in size and converted to a suitable format for presentation on a computer display, for example TIFF, GIF, or JPEG. The image may then be presented on the displays of other users as an iconic representation of the presence of the participant in the meeting. For example, the image may be presented at the remote location among a set of pictures indicating who is present at the local location. Participants can indicate the recipients of items such as emails and notes by selecting the image of other participants. FIG. 4 depicts an embodiment of participant images 42.

Alternatively, images of the participants may be retrieved from a database of user information, based on a username obtained from participant transponders or by the login or ID card reader mechanisms described herein. Alternatively, the image may be stored directly on the ID card.

Regardless of the technique used to obtain the image of the participant, by presenting images in addition to names, the AVTC system provides a natural way for one participant to determine other participants currently present. Because many individuals find faces easier to recognize and remember than names, this approach allows participants to interact with one another in a more comfortable manner.

Directional LED Participant Notification

During video conferences with multiple participants at a single site, it is often desirable to obtain the attention of a single participant without disturbing the other participants. For example, the AVTC system may wish to notify a participant that he is needed in another meeting, that new email has arrived, or that a note has been received via the collaborative interface.

To provide such notification, the AVTC system incorporates a directional LED-based cueing device. An LED is positioned at the end of a relatively long tube, with the axis of LED illumination directed along the length of the tube. The axis of the tube is aligned with the participant to be alerted so that when the LED is illuminated, it is visible only to the intended participant. The length of the tube is selected based on the spacing between participants and the distance from the tube to the participants.

Preferably, the system provides one notification device for each participant. Alternatively, a single tube and LED may be actuated, such that it may be aligned with a particular participant to be notified. Notably, the preferred embodiment offers the advantage of simultaneous notification of more than one participant. Further, the LED and tube are preferably positioned near the main display, so that the notification device is usually within the field of view of the participant. In one embodiment, the tubes are mounted along the optical axis of the cameras aimed at each participant. The notification device can then further function as an alignment device, wherein each participant may adjust his position until he or she is aligned with the tube, ensuring a properly composed individual shot.

Alternatively, an alert may be presented on a personal display located alongside the participant. However, because the primary focus of the participant is on the main display, LED-based notification is preferred, because it more likely to be immediately noted by the participant.

Camera Coverage of Secondary Participants

Since wide views do not give sufficient participant details, most shots in a videoconference are close-ups. However, these do not give remote participants a feel for the surrounding conference room environment and of secondary participants.

To address this problem, the AVTC includes one or more room microphones and cameras that provide audio and camera coverage of secondary participants not positioned at stations. For example, if the primary participants are seated at a conference table centered in front of a monitor positioned flush with one wall of a conference room, the room cameras provide coverage of the corners of the room on the side opposite the monitor.

The video and audio signals provided by the room cameras and microphones are provided to the autodirector. The autodirector then determines appropriate times to transmit these video and audio feeds to the remote location, providing a sense of context to the remote participants. For example, the room camera feed may be selected when the primary participants are quiet, when a secondary participant speaks for an extended period of time, or if the entry or exit of a participant through a conference room doorway is detected.

Collaborative Table

The AVTC provides participants with a collaborative table upon which objects and hand gestures can be viewed at several sites.

For convenience, the table at one 'site is termed the source table, and the table at a second site is termed the viewing table. A participant sits at the source table and places objects or documents of interest upon it. Above the source table is a high definition table videocamera which captures images of the objects, which are encoded and transmitted. At the other site or sites, a projector, preferably high-resolution and overhead mounted, projects the images onto the viewing table.

Figure 3:
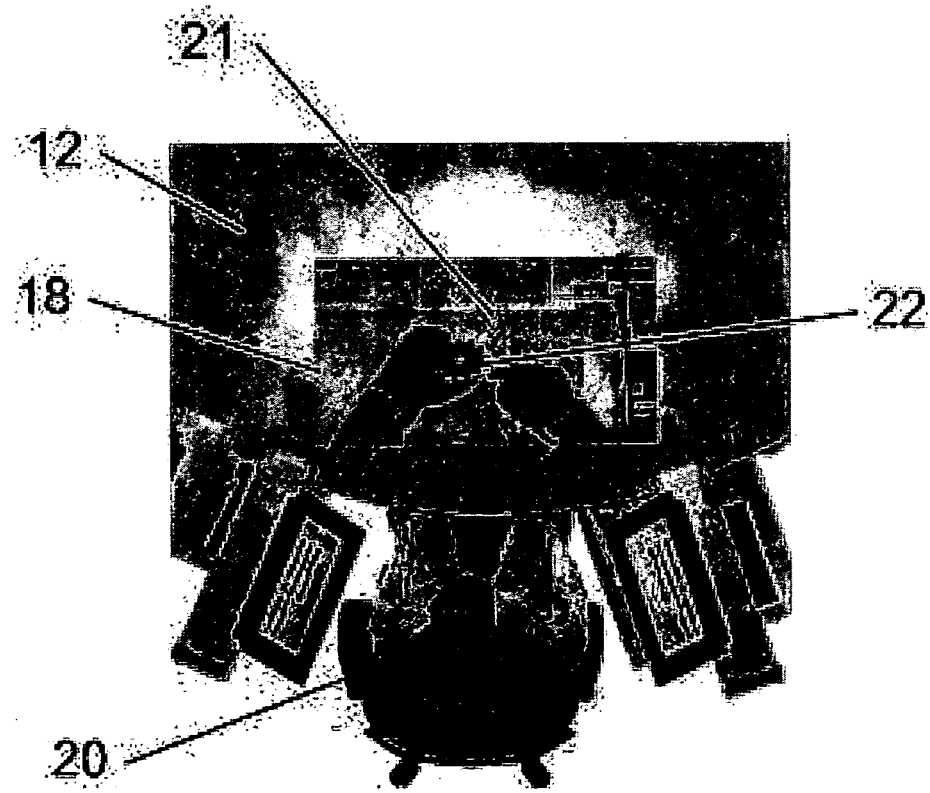
FIG. 3 depicts an overhead view of the portion of the conference table onto which the collaborative table is projected, according to the invention.

FIG. 3 depicts an overhead view of the portion of the conference table onto which the collaborative table is projected, according to the invention. The image 18 is projected on the conference table 12 from a projector overhead from another video teleconference site, and is centered in front of the participant 20 situated at the middle of the conference table. The high definition image shows both still objects in the background 21 and the hands of a participant at the other site manipulating a solid object 22.

If the source participant gestures with his hands over the source table, then the participant at the viewing table sees the source participant's hands. Given limited bandwidth, this leads to a seemingly conflicting requirements whereas objects of interest should be presented at the maximum possible quality (low frame rate), yet the hand gestures should appear smooth and fluid (high frame rate). In addition, the participant at the viewing table should in turn be able to make hand gestures at the projected objects, that are in turn sent and projected onto the source table.

Encoding

Described below are three embodiments of an encoding scheme for the collaborative table which provide for both high resolution, largely static scenes, with lower resolution but high frame rate hand gestures and motion. These approaches range from an computationally less expensive but lower quality method (motion detection) to a high quality custom mechanism.

Motion Detection with High and Low Frame Rate Encodings

Open source MJPEG code is used to generate a motion JPEG RTP stream with tight custom encoding. MJPEG allows different image resolutions in each frame, and each frame is JPEG encoded with no intraframe dependencies. The system constantly captures images and detects significant changes between frames. If no significant change has occurred over a period of time, then the system enters static mode, and sends a high quality JPEG frame onto the channel via RTP. A single high quality frame takes several seconds to send at T1 bandwidths, and is sent about every 30 seconds so that any new listeners are updated in a timely manner.

If the system detects a significant change in the frame above a certain threshold, it immediately switches to dynamic mode, encoding high frame rate, lower resolution images into the RTP MJPEG stream. Listening clients automatically adjust to the new frame resolution. Because the system is MJPEG compliant, it can use an existing RTP/MJPEG client with little or no modification. If new motion is not detected after several seconds, the system switches back to static mode and starts sending high quality, very low rate frames.

A disadvantage of this technique is that if, for example, the source table consists of a map over which someone is gesturing, when the person gestures over part of the image with their hands the entire image, including the map, is degraded to illegible quality until the person removes their hand or holds their hand very still.

Masked Hybrid: High and Low Frame rate Streams with Masking

In dynamic mode, this technique uses a new RTP channel called the mask channel, containing low resolution run-length-encoded bit-masks to correspond to each of the transmitted high frame-rate, low quality MJPEG dynamic frames.

When the source system enters dynamic mode, it retains the last transmitted static high quality frame as a reference image and compares all successive dynamic frames to a scaled down reference frame. It computes and thresholds the pixel-by-pixel change between the reference frame, scaled to the dynamic mode resolution, and each dynamic frame and builds a bit-mask of changed areas. This bit-mask is labeled and transmitted on the mask channel after the dynamic frame is sent. Each RTP display client receives the mask and the dynamic frame, and correlates the two according to the label. The client then copies the high resolution reference frame, and overlays the scaled-up dynamic frame according to the mask.

This technique allows stationary objects on the source table to retain their full-resolution appearance while low fidelity, high frame rate hand gestures are overlaid in a lower resolution.

Custom Encoding

A higher quality solution is obtained with an entirely custom coding strategy. The high resolution scene is decomposed into a multiscale image, composed of a stack of images with the lowest quality base image overlaid by successive images. These images contain higher order terms refining the quality of the base image up to any level of desired quality, very similar to a wavelet deconstruction.

The base image is small enough to allow a full frame, high rate transmission in any circumstance, e.g. 135×238×2 bit greyscale. Higher order images successively increase depth and resolution in scale space up to full high-definition, 1080i resolution. For a transmission model, the images are subdivided into about 1024 spatial blocks.

To create the multiscale image, starting at the base layer the encoder computes a difference value from the prior frame for each spatial block. If the difference value for a block at that layer is significant, than the encoder flags the block and all corresponding higher layer image blocks as needing to be retransmitted with a certain disparity score. The encoder then starts at the base layer and transmits via RTP each changed block in that layer in the order of it's disparity score and marks the transmitted blocks as current.

If there is time before the next frame, the encoder then goes to the second order image in the stack and transmits any flagged blocks until it either runs out of bandwidth before the next frame, or runs out of flagged blocks on that layer image. If there is time before the next frame, then the encoder traverses higher and higher layer images and transmits changed blocks, dynamically capturing more and more image detail.

If the scene becomes static, this transmission algorithm automatically builds and transmits a high quality representation of the image over several seconds because small changes such as lighting and camera noise, should not affect the lower layer base images. This gives the encoder time to transmit blocks from the detailed higher order images.

In the case of a largely static scene with a hand moving over it, performance is boosted by comparing each block not just with the prior frame, but also with a reference frame that has been built up over time. If a hand is removed from over a portion of a static scene, and that portion of the image corresponds well with the reference image, then those blocks can be flagged to revert to their detailed reference state instead of being queued for full retransmission. Each client maintains the shared multiscale representation, adjusting it as new blocks or "revert block to reference state" flags are sent.

This algorithm provides optimal performance for the stated requirements, providing high frame rate when change is prevalent, but at the maximum allowable quality given the amount of change in the scene, while preserving a high quality reference state.

Simultaneous Projection and Image Capture

Challenges arise when simultaneously capturing and projecting video onto the collaborative table. For example, a map on the source table is projected onto to the viewing table, while simultaneously the hands of the participant at the viewing table (pointing at the projected map) are projected onto the source table. The problem is that not only the map image, but also the hands of the participant at the viewing table projected onto the source table, are transmitted back to the viewing table.

In theory, both the actual map on the source table and the projected hands could be captured, subtract the projected hands, then transmit the map image without the hands. In reality, this is a nontrivial if not incomplete problem, especially when the projection include three-dimensional items of unknown shape, varying reflectivity, and unknown color.

Instead, the system momentarily blanks the projector to black when the camera is capturing a frame, and runs both the table videocamera and the projector at a reduced duty cycle and frame rate. By synchronizing the camera capture, only 30 ms are needed to capture a frame. Because encoding and transmitting at full frame rate may be impractical for the reasons described earlier, capture is preferably executed at 5 frames/sec by blanking the projector 5 times a second for 30 ms each time. This blanking is generally imperceptible to the viewer of the projection.

Projector Blanking Issues

Implementing the projector blanking solution presents two practical problems:

Rapid and precise blanking—Successfully blanking the projector by interrupting the video to it for a period of a video frame requires a rapid response from the projector. While LCD projectors typically have somewhat slow response times, a broadcast frame is considerably longer than a typical high resolution graphics frame, so an LCD projector may be suitable. However, using a higher quality CRT-based projector is preferable due to their faster response times.

For the software driving the projector, swapping the video output to a blank buffer for a few frames and outputting a synchronization trigger signal for the camera can be readily achieved with contemporary consumer graphics cards. If the image buffer is to be redrawn while the blank buffer is being displayed, the double buffering functionality supported by the majority of graphics cards may be used.

Another approach to blanking the projector without concern for the projector response time incorporates an LCD shutter over the projector lens. This reduces the gain of the projection, but existing stereo vision LCD shutter glasses demonstrate that LCD shutter response time is far more than adequate for a broadcast frame blanking.

Synchronized blanking—Synchronization of the blanking with image capture is achieved using an external sync signal. However the sync signal is generated, e.g. by the camera or by an external source, the signal is input into a counter to signal the computer to blank the projection periodically and capture the next frame, with suitable projector refresh timing. Latencies in the capture hardware may complicate this process slightly. Because the horizontal refresh rate for the projector is likely to be two or three times the broadcast frame capture rate, delay due to projector frame rate should be minimal. Regardless, with a fast enough projector, the timing problem is readily addressed.

An alternate embodiment polarizes the light from the projector, and use a polarizing filter on the camera to filter out the polarized projected image, which may be preferable to the more complex projector blanking and camera synchronization solution.

Background Segmentation

At the viewing table, the system simultaneously-captures the viewer's hand gesturing with the camera while projecting the source table's images onto the table. The same projector/camera synchronization described above is used to separate the hands from the projection. The background for the viewing table is presumed to be white or some other solid color. However, an additional problem is encountered at the viewing end, namely that only the viewer's hands should be projected down onto the source table, without adding a lot of light and flicker by projecting the white background onto the source table.

Thus, the viewer's hands are masked from the (presumably) white background, and replaced with a black mask. This is easily accomplished through simple thresholding. If the background is a color other than white, color segmentation and connected component labeling can be performed on the viewer side before encoding of the hand video. If the background is not a solid color, background segmentation is slightly more complicated, but may be performed with the thresholded background masking described herein in connection with encoding.

Camera-Projector Calibration

To ensure proper functioning of the hand overlays from the viewing table to the source table, it is necessary to calibrate the relative position and scale of the projected image and the camera capturing the hand motion on the viewing table. This calibration may be automated by projecting a set of patterns onto the table and detecting their position in the camera with simple image processing. Merely projecting a solid screen and detecting the corners provides most of the necessary parameters.

Although the invention is described herein with reference to several embodiments, including the preferred embodiment, one skilled in the art will readily appreciate that other applications may be substituted for those set forth herein without departing from the spirit and scope of the invention.

Accordingly, the invention should only be limited by the following claims.

The invention claimed is:

1. A video teleconferencing (VTC) system comprising:
   at least one site with at least one station at each said site, each station accommodating one participant;
   a first display screen within view of each participant;
   a videocamera associated with each station and positioned wherein a participant at said each station is located within said videocamera's field of view;
   at least one microphone, wherein each participant situated at each station falls within the audio range of said microphone;
   an automated video switching system that, based on audio activity and operating modes:
   automatically selects, from among one or more video camera feeds and inputs, a video signal for transmission to one or more remote videoconferencing sites; and
   selects from among incoming video signals a single incoming signal for display on said first display, wherein each of said at least one video conferencing sites receives one or more incoming video signals; and
   an interface at each station comprising a second display screen and collaboration tools for communication of nonverbal information between said each participant.

2. The VTC of claim 1, wherein said system contains more than one station at a site.

3. The VTC of claim 1, wherein said automated video switching system has operating modes that adjust video selection criteria and parameters.

4. The VTC of claim 3, wherein said operating modes can be created by the user.

5. The VTC of claim 3, wherein said operating modes can be adjusted by the user.

6. The VTC of claim 3, wherein said automated video switching system comprises a speech mode, wherein the image of a specified participant at a site is displayed continuously to all participants at other sites.

7. The VTC of claim 3, wherein said automated video switching system comprises a lecture mode, wherein two specified participants at different sites view only each other, and wherein all participants at other than said different sites view said two specified participants alternately.

8. The VTC of claim 3, wherein said automated video switching comprises a view force mode, wherein an individual site can force selection of a particular videocamera at said individual site, such that all other sites when viewing said individual site will view only the video signal from said particular videocamera.

9. The VTC of claim 1, wherein, said automated video switching comprise a fast switching mode, wherein videocameras are selected quickly and often to track rapid exchanges such as that occur in an initial phase of a videoconference, when individuals introduce themselves and meet one another.

10. The VTC of claim 1, wherein said collaboration tools comprise a means of sending notes to other stations.

11. The VTC of claim 1 further comprising at least one speaker wherein audio produced by said speaker is reflected from said display screen, such that said audio appears to said each participant to be originating from said display screen.

12. The VTC of claim 1, further comprising a collaborative table, comprising:
a table videocamera positioned to capture images of a table surface situated at a first of said at least one site; and
a projector, located at another of said at least one site, communicatively coupled with said table videocamera and positioned to project images received from said table videocamera onto a viewing surface.

13. The VTC of claim 12, wherein stationary portions of the image from said table videocamera are encoded for transmission at relatively high resolution and moving portions of said image are encoded for transmission at relatively low resolution for efficient use of available communications bandwidth.

14. The VTC of claim 12, wherein said image is decomposed into a multiscale stack of Images, comprised of a low resolution base image and successively higher resolution terms, and wherein said higher resolution terms can be combined with said low resolution base image to form images of selectable quality and size to accommodate available communications bandwidth.

15. The VTC of claim 1, said automated video switching system comprising a speech recognition system for detecting key expressions comprising any of said each participant names and key phrases and for adjusting switching behavior accordingly.

16. The VTC of claim 1, further comprising a means for identifying participants by a signal from participant transponders, such as radio frequency identification (RFID) tags.

17. The VTC of claim 1, further comprising selectably energizable light sources, positioned to gain attention of specific participants without alerting other participants.

18. The VTC of claim 17, wherein said light sources are LEDs, affixed to said videocan,era associated with each station, wherein said LEDs are aligned with the optical axis of said videocamera associated with each station and mounted so as to alert only the participant at said each station.

19. The VTC of claim 17, wherein said light sources are LEDS, affixed to said videocamera associated with each station, wherein said LEDs are aligned with the optical axis of said videocamera associated with each station and mounted so as to alert only the participant at said each station.

20. The VTC of claim 1, further comprising selectably energizable light sources, positioned to gain attention of specific participants without alerting other participants.

21. A video teleconferencing (VTC) system comprising:
at least one site with at least one station at each said site, each station accommodating one participant;
a first display screen within view of each participant;
a videocamera associated with each station and positioned wherein a participant at said each station is located within said videocamera's field of view;
at least one microphone, wherein each participant situated at each station falls within the audio range of said; and
an automated video switching system that, based on audio activity and operating modes for adjusting selection criteria and parameters:
automatically selects, from among one or more video camera feeds and inputs, a video signal for transmission to one or more remote videoconferencing site; and
selects from among incoming video signals a single incoming signal for display on said first display, wherein each of said at least one video conferencing sites receives one or more incoming video signals.

22. The VTC of claim 21, wherein said system contains more than one station at a site.

23. The VTC of claim 21, each of said stations further comprising an interface comprising a second video display and collaboration tools for communication of nonverbal information between said each participant.

24. The VTC of claim 23, wherein said collaboration tools comprise a means for sending notes to other stations.

25. The VTC of claim 21, wherein said operating modes can be created by the user.

26. The VTC of claim 21, wherein said operating modes can be adjusted by the user.

27. The VTC of claim 21, wherein said operating modes comprise a speech mode, wherein the image of a specified participant at a site is displayed continuously to all participants at other sites.

28. The VTC of claim 21, wherein said operating modes comprise a lecture mode, wherein two specified participants at different sites view only each other, and wherein all participants at other than said different sites view said two specified participants alternately.

29. The VTC of claim 21, wherein said operating modes comprise a view force mode, wherein an individual site can force selection of a particular videocamera at said individual site, such that all other sites when viewing said individual site will view only the video signal from said particular videocamera.

30. The VTC of claim 21, wherein said operating modes comprise a fast switching mode, wherein videocameras are selected quickly and often to track rapid exchanges such as that occur in an initial phase of a videoconference, when individuals introduce themselves and meet one another.

31. The VTC of claim 30, wherein stationary portions of the image from said table videocamera are encoded, for transmission at relatively high resolution and moving portions of said image are encoded for transmission at relatively low resolution for efficient use of available communications bandwidth.

32. The VTC of claim 30, wherein said image is decomposed into a multiscale stack of images, comprised of a low resolution base image and successively higher resolution terms; and wherein said higher resolution terms can be combined with said low resolution base image to form images of selectable quality and size to accommodate available communications bandwidth.

33. The VTC of claim 21, further comprising at least one speaker wherein audio provided by said speaker is reflected from said display screen, such that said audio appears to said participants to be originating from said display screen.

34. The VTC of claim 21, further comprising a collaborative table, the collaborative table comprising:
- a table videocamera positioned to capture images of a table surface situated
- at a first of said at least one site; and
- a projector, located at another of said at least one site, communicatively coupled with said table videocamera and positioned to project images received from said table videocamera onto a viewing surface.

35. The VTC of claim 21, said automated video switching system comprising a speech recognition system for detecting any of said each participant names and key phrases and for adjusting switching behavior accordingly.

36. The VTC of claim 21, further comprising a means by identifying participants by a signal from participant transponders, such as radio frequency identification (RFID) tags.

* * * * *